United States Patent

[11] 3,534,797

| [72] | Inventors | Theodor Reinhard<br>Boblingen;<br>Ernst Haug, Maichingen and Hermann<br>Moller, Aidlingen, Germany |
|---|---|---|
| [21] | Appl. No. | 770,357 |
| [22] | Filed | Oct. 24, 1968 |
| [45] | Patented | Oct. 20, 1970 |
| [73] | Assignee | Daimler-Benz Aktiengersellschaft<br>Stuttgart-Unterturkheim, Germany |
| [32] | Priority | Oct. 24, 1967 |
| [33] | | Germany |
| [31] | | 1,625,306 |

[54] ADAPTOR SLEEVE
8 Claims, 3 Drawing Figs.

[52] U.S. Cl. ................................. 151/41.75,
85/70, 85/80
[51] Int. Cl. .................................. F16b 13/04
[50] Field of Search........................... 151/41.75,
41.74; 85/70, 71, 80, 1(J.P.); 287/189.36(F); 52/617

[56] References Cited
UNITED STATES PATENTS

| 2,409,352 | 10/1946 | Gill............................... | 85/70 |
| 3,013,643 | 12/1961 | Perry............................ | 85/70 |
| 3,014,563 | 12/1961 | Bratton........................ | 85/70 |
| 3,197,854 | 8/1965 | Rohe et al.................... | 85/70 |
| 3,200,694 | 8/1965 | Rapata......................... | 151/41.75 |
| 3,313,079 | 4/1967 | Phelan.................... | 287/189.36(F)UX |
| 3,343,442 | 9/1967 | Knowlton et al............. | 85/70 |

FOREIGN PATENTS

| 907,899 | 10/1962 | Great Britain............... | 85/70 |
| 996,455 | 6/1965 | Great Britain............... | 85/80 |
| 510,011 | 2/1955 | Canada ........................ | 85/70 |
| 40,199 | 7/1965 | Germany...................... | 151/41.75 |
| 932,408 | 11/1947 | France ......................... | 85/70 |
| 1,210,351 | 9/1959 | France ......................... | 85/70 |

*Primary Examiner*—Marion Parsons, Jr.
*Attorney*—Craig, Antonelli, Stewart & Hill ABSTRACT: A clamping sleeve which consists of a casing made from an elastic material and of a threaded insert, preferably made from metal; the casing is provided with a circumferential groove while the circumferential groove of the casing is adjoined on one side by a sealing lip and by a collar and on the other side by a section with an initially conically and thereupon cylindrical part.

Patented Oct. 20, 1970 3,534,797

INVENTORS
THEODOR REINHARD
ERNST HAUG
HERMANN MÖLLER

BY *Craig & Antonelli*

ATTORNEYS

ADAPTOR SLEEVE

The present invention relates to an adaptor or clamping sleeve in which a preferably metallic threaded insert is surrounded by a sleeve consisting of an elastic material such as, for example, rubber or synthetic resinous material.

The aim of the present invention resides in creating an adaptor or clamping sleeve which can be easily pressed-in into a mounting aperture in order to be then safely and securely anchored therein.

As solution to the underlying problems an adaptor or clamping sleeve with a casing of an elastic material such as rubber or synthetic resinous material and with a threaded core consisting preferably of metal is proposed in which according to the present invention the casing is provided with a circumferential groove that is adjoined toward one side by a sealing lip and by a collar and toward the other side by a section with an initially conically tapering and subsequently cylindrical part.

In order that an easy pressing-in into the mounting aperture is possible also with tough material, an annular space extends—starting from the collar—between threaded insert and casing up to approximately the beginning of the conical area of the casing part.

In a preferred embodiment according to the present invention, the upper edge of the collar projects in the unstressed condition beyond the threaded insert so that during fastening also a good seal at curved surfaces is achieved.

A disengagement of threads which can be unthreaded only with difficulty is possible according to the present invention if one end of the threaded insert projects below the casing, and if this end is provided with at least two parallel surfaces for the engagement, for example, of a fork wrench or spanner.

According to a further feature of the present invention, the threaded insert is provided with notches or recesses in which are anchored webs of the casing.

A penetration of dust and moisture into the space adjoining the mounting aperture is prevented with a pressed-in adaptor sleeve or clamping sleeve if the thread of the threaded insert terminates in a dead end bore.

Accordingly, it is an object of the present invention to provide an adaptor sleeve which eliminates by simple means the aforementioned shortcomings and drawbacks encountered in the prior art.

Another object of the present invention resides in a clamping sleeve of the type described above which can be easily pressed into the mounting aperture, yet assures a safe and reliable anchoring in the assembled position.

A further object of the present invention resides in a clamping sleeve which can be readily installed also into apertures in curved surfaces without jeopardizing the sealing property thereof.

Still a further object of the present invention resides in a clamping sleeve of the type described above which not only permits use of relatively tough material for the casing part but also assures easy disengagement of the threaded parts by simple manipulation.

Another object of the present invention resides in an adaptor sleeve of the type described above which prevents the penetration of dirt and moisture into the space adjoining the mounting aperture.

These and further objects, features, and advantages of the present invention will become more obvious from the following descriptions when taken in connection with the accompanying drawing which shows, for purposes of illustration only, one embodiment in accordance with the present invention, and wherein.

Figure 1:
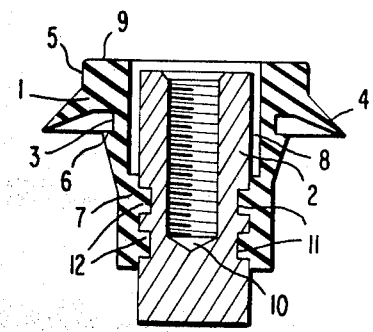
FIG. 1 is an axial cross-sectional view through a clamping sleeve in accordance with the present invention in its condition ready for installation.

Referring now to the drawing wherein like reference numerals are used throughout the various views to designate like parts, and more particularly to FIG. 1, the clamping sleeve consists principally of a casing 1 and of a threaded insert 2. The casing 1 is provided with a circumferential groove 3 which is adjoined toward one side by a sealing lip 4 and by a collar 5 and toward the other side by an offset 6 having a part 7 initially tapering conically and then continuing cylindrically. The annular space 8 extends—starting from the collar 5—between casing 1 and threaded insert 2 and reaches approximately up to the beginning of the conical section of the part 7. It is furthermore clearly visible from the drawing that the upper edge 9 of the collar 5 projects above the threaded insert 2 whose thread terminates in a dead end bore 10. Furthermore, the threaded insert 2 is provided with notches or recesses 11 in which are anchored the webs 12 of the casing 1.

Figure 2:
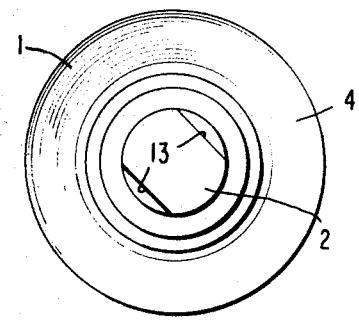
FIG. 2 is a plan view in the axial direction on the part of the threaded insert projecting below the casing.

It can be readily seen from FIG. 2 that the end of the threaded insert 2 extending below the casing 1 is provided with two parallel surfaces 13 for the engagement of a fork wrench or spanner.

Figure 3:
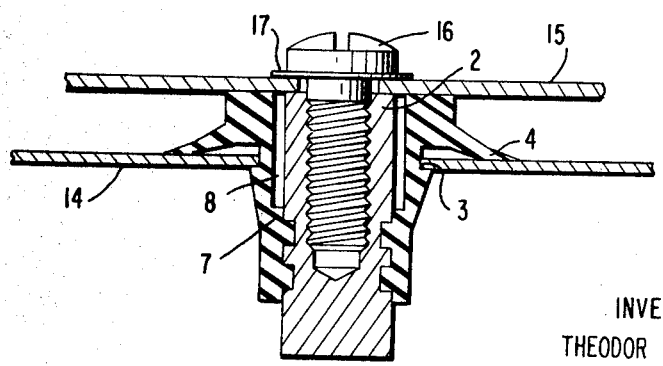
FIG. 3 is an axial cross-sectional view through the clamping sleeve in accordance with the present invention in the assembled condition.

In FIG. 3, the assembly of a clamping sleeve in accordance with the present invention is illustrated for the fastening of a part at a surface whereby the fastening of the license plate of a motor vehicle is indicated as the example.

During pressing-in of the clamping sleeve into the body wall 14, the conical section of the part 7 is pressed inwardly which is made possible by the annular space 8. Subsequently thereto, the circumferential groove 3 engages in the bore of the body wall 14 whereby simultaneously the conical section of the part 7 again curves outwardly by reason of the elastic property of its material. The sealing lip 4 abuts against the body wall 14 so that already by the pressing-in of the clamping sleeve, a sealing and secure mounting is achieved. A removal of the clamping sleeve from the threaded side of the threaded insert is no longer possible. The fastening of the license plate 15 takes place by means of a screw 16 whereby a sealing ring 17 is provided for sealing the thread. During the fastening operation, the collar 5 and therewith also the sealing lip 4 is pressed against the body wall 14 whereby a secure mounting of the license plate 15 is achieved.

While I have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A device for retaining a part in fixed relationship with a platelike member having an aperture therein, comprising casing means fabricated from an elastic material and adjacent said groove on one side thereof and an offset disposed adjacent said groove on the other side thereof, said offset defining the end of a section of said casing means which includes an initially tapering peripherial surface of substantially conical configuration which is continued by a cylindrical extension, and threaded insert means fabricated from metal disposed within said casing means and secured thereto, wherein said casing means includes an internally recessed portion extending from one end thereof to a point opposite said tapering peripheral surface, said internally recessed portion, together with the peripheral surface of said insert means, defining an annular space therebetween.

2. A device according to claim 1, wherein said one end of said casing means extends beyond the corresponding end of said insert means when said casing means is in an unstressed condition.

3. A device according to claim 2, wherein the opposite end of said insert means extends beyond the opposite end of said casing means, said opposite end of said insert means including at least two parallel surfaces adapted for engagement with a fork wrench.

4. A device according to claim 3, wherein said insert means is provided with recess means in the peripheral surface thereof and said casing means includes internally extending web portions dimensioned and positioned so as to engage firmly within said recess means.

5. A device according to claim 4, wherein said insert means includes a tapped hole terminating in a dead end bore.

6. A device for retaining a part in fixed relationship with a platelike member having an aperture therein, comprising casing means fabricated from an elastic material and including a continuous circumferential groove, sealing lip means disposed adjacent said groove on one side thereof and an offset disposed adjacent said groove on the other side thereof, said offset defining the end of a section of said casing means which includes an initially tapering peripheral surface which is continued by a cylindrical extension, and threaded insert means disposed within said casing means and secured thereto, wherein said casing means includes an internally recessed portion extending from one end thereof to a point opposite said tapering peripheral surface, said internally recessed portion, together with the peripheral surface of said insert means, defining an annular space therebetween.

7. A device according to claim 6, wherein said one end of said casing means extends beyond the corresponding end of said insert means when said casing means is in an unstressed condition.

8. A device for retaining a part in fixed relationship with a platelike member having an aperture therein, comprising casing means fabricated from an elastic material and including a continuous circumferential groove, sealing lip means disposed adjacent said groove on one side thereof and an offset disposed adjacent said groove on the other side thereof, said offset defining the end of a section of said casing means which includes an initially tapering peripheral surface which is continued by a cylindrical extension, and threaded insert means disposed within said casing means and secured thereto, wherein the opposite end of said insert means extends beyond the opposite end of said casing means, said opposite end of said insert means including at least two parallel surfaces adapted for engagement with a fork wrench.